L. A. BOCKSTAHLER.
FRUIT CLIPPER.
APPLICATION FILED JAN. 29, 1916.
1,242,645.
Patented Oct. 9, 1917.
3 SHEETS—SHEET 1.
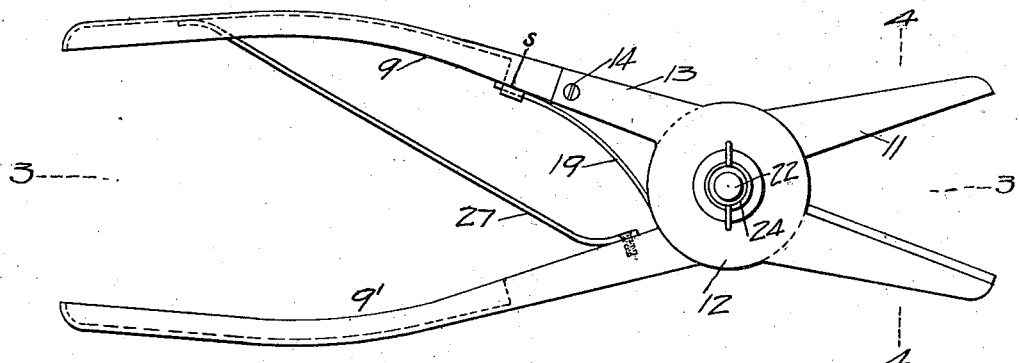
Fig. 1.
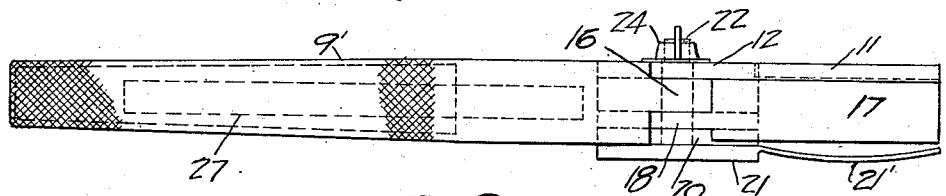
Fig. 2.
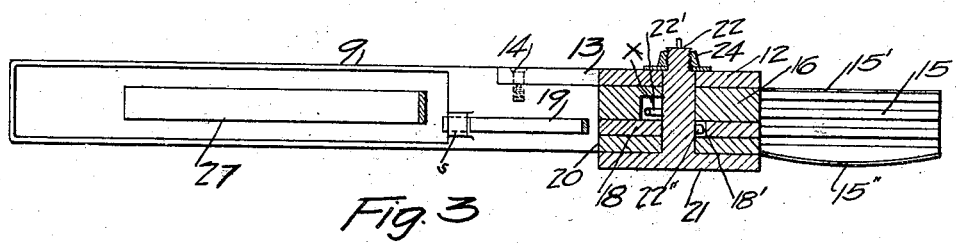
Fig. 3.
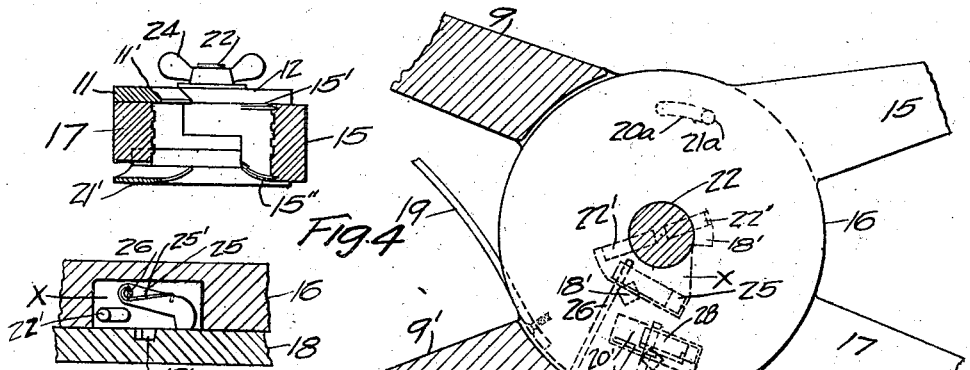
Witnesses
Inventor
Louis A. Bockstahler
By John A. Bornhardt
Attorney

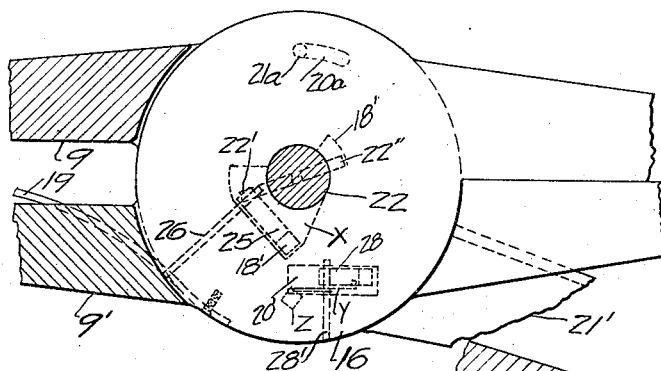
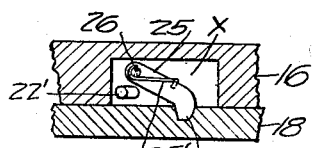
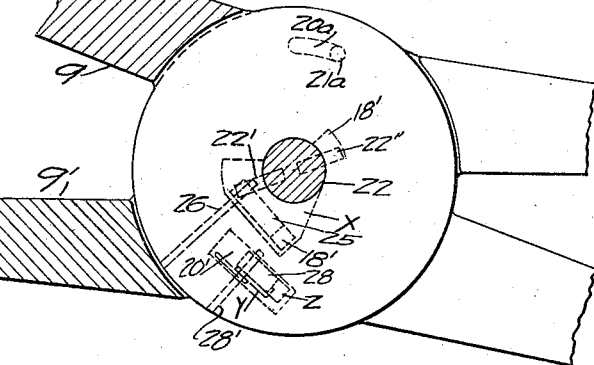
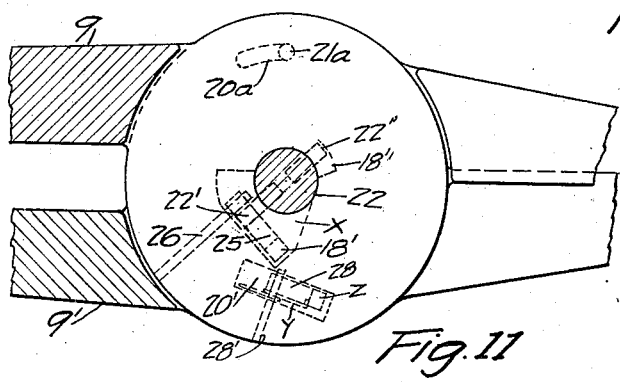
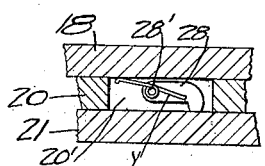
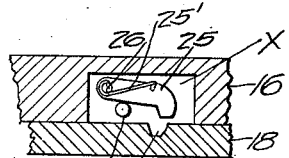

L. A. BOCKSTAHLER.
FRUIT CLIPPER.
APPLICATION FILED JAN. 29, 1916.
1,242,645.
Patented Oct. 9, 1917.
3 SHEETS—SHEET 3.
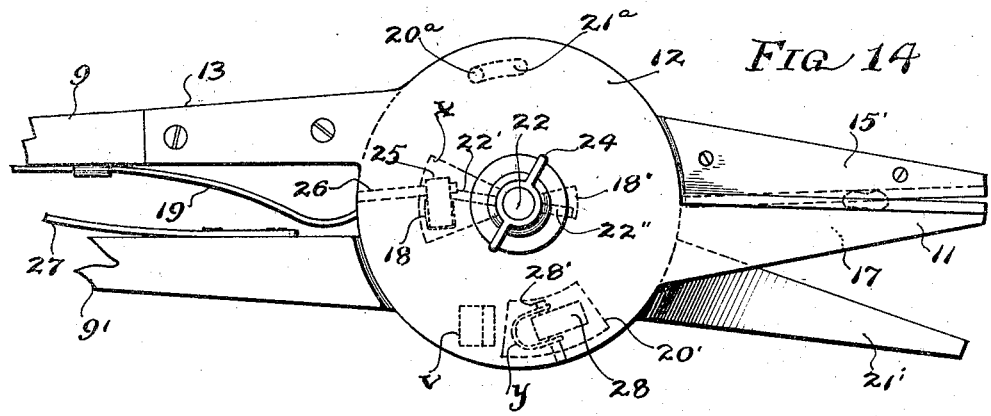
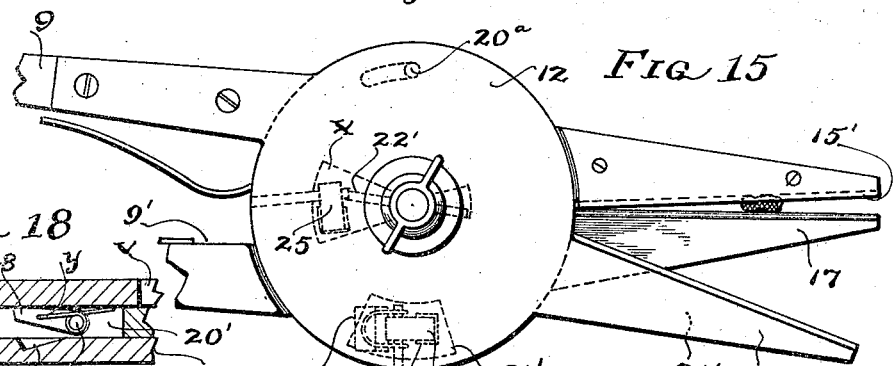
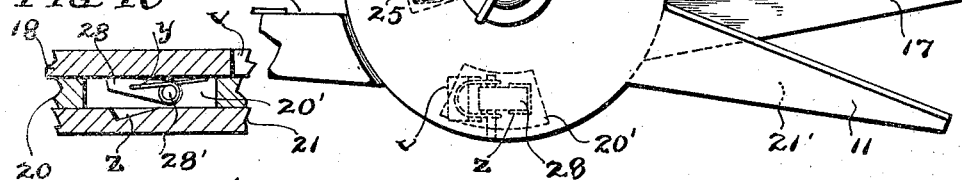
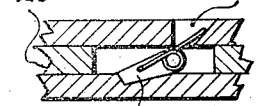
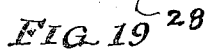
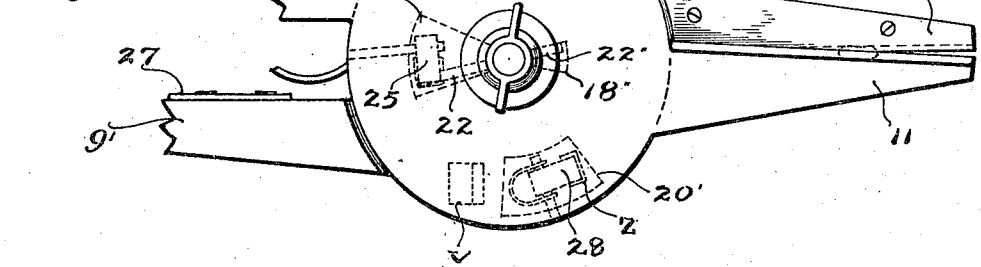
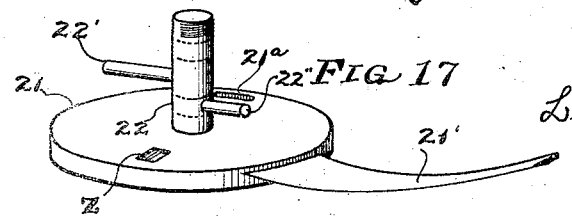

UNITED STATES PATENT OFFICE.

LOUIS A. BOCKSTAHLER, OF CLEVELAND, OHIO.

FRUIT-CLIPPER.

1,242,645.     Specification of Letters Patent.     Patented Oct. 9, 1917.

Application filed January 29, 1916. Serial No. 75,103.

*To all whom it may concern:*

Be it known that I, LOUIS A. BOCKSTAHLER, citizen of the United States, residing at Cleveland, in the county of Cuyahoga and State of Ohio, have invented certain new and useful Improvements in Fruit-Clippers, of which the following is a specification.

This invention relates to fruit clippers, and has for its object to provide devices with which to pick fruit such as oranges, grape-fruit, grapes or any other fruit having stems which must be severed by a cutting tool. Another object of the invention is to form an improved device with which, after the stems are severed, the fruit is held by means of jaws engaging the stem, and, by a final operation, the stem is then cut off to drop the fruit in a proper receptacle without coming in contact with the hands of the operator.

In the accompanying drawings—

Figure 1 is a plan view of the clipper.

Fig. 2 is an edge view thereof.

Fig. 3 is a longitudinal section on the line 3—3 of Fig. 1.

Fig. 4 is a detail in cross section on the line 4—4 of Fig. 1.

Fig. 5 is a detail in section showing the jaws in position ready for use.

Fig. 6 is a detail in section showing the pawl arrangement between two of the pivoted parts.

Fig. 7 is a detail showing the position of the jaws after the first operation.

Fig. 8 is a detail in section showing the pawl shown in Fig. 6 in engaged position.

Fig. 9 is a detail showing the parts at the second operation.

Fig. 10 is a detail of the pawl at the position shown in Fig. 9.

Fig. 11 is a view of the jaws in the last operation.

Figs. 12 and 13 are details of the pawls shown in Figs. 10 and 6, respectively, in different positions.

Fig. 14 is a plan showing the instrument after the first operation, at which the stem of the fruit is cut from the stalk.

Fig. 15 is a similar view of a later position, with the cutting blades open, and the fruit stem held by the jaws.

Fig. 16 is a similar view of a final position, when the stem is cut off from the fruit.

Fig. 17 is a perspective of one of the disks and a blade attached thereto.

Figs. 18 and 19 are details of modified pawls.

The tool is of the pliers type, and comprises a pair of handles, five disks at the pivot, two pairs of knives, two gripping jaws, and other parts as hereinafter described, the operation being to first close one pair of knives and the jaws to cut the stem from the stalk or vine and grip the stem, second to operate the other pair of knives to cut the stem from the fruit, and third to restore the parts to original position.

One handle is indicated at 9 and the other at 9'. To the former is fastened, as by an arm 13 and a screw 14, a disk 12. The handle 9 also carries a disk 20 at the opposite side of the tool. A knife 11 is secured to or projects from the disk 12. The handle 9' is fastened to or projects from a disk 16 to which is fastened a jaw 15 carrying, at its opposite sides, knives 15' and 15'', the former of which coöperates with the knife 11 and the latter of which coöperates with a knife 21' carried by a disk 21 mounted on the pivot pin 22 which extends through all the other disks and is fastened by a nut 24. On said pin, between the disks 16 and 21, is a disk 18 to which is attached a spring 19 which bears at *s* against the handle 9. This disk 18 carries a jaw 17 which coöperates with the jaw 15. It will be seen that there are two pairs of knives, one pair, 11 and 15', connected respectively to the handles 9 and 9', and the other pair, 15'' and 21', connected respectively to the handle 9' and the disk 21, and a pair of jaws 15 and 17 connected respectively to the handle 9' and the disk 18, the intermediate disks 16, 18 and 20, as well as disk 12, turning on the pivot pin 22.

In the disk 16 is a recess *x* containing a pawl 25 pivoted on the pin 26, with a spring 25' pressing on the pawl and tending to engage the same in a notch 18' in the disk 18. In the disk 20 is a recess 20' containing a pawl 28 pivoted on the pin 28' and having a spring *y* which tends to hold the pawl out of the notch *z* in the outer disk 21, as indicated in Fig. 18. The tail of the spring projects in position to engage in a recess *v* in the disk 18, and thereby force pawl 28 into notch z, as shown in Figs. 12 and 19, in one position, and to lift said pawl out of the notch z by relative movement of the disk 18, as shown in Figs. 10 and 18. The pivot 22 carries a pin 22' which moves in the recess x in the disk 16, and also, at its opposite side, a pin 22'' which moves in a slot or recess 18' in the disk 18. The pin 22' acts to lift the pawl 25, and the pin 22'' to arrest the movement of the disk 21. The disk 20 has a pin 20ª which engages in a segmental slot 21ª in the disk 21. A spring 27 acts to force the handles apart.

The operation is as follows: When the handles 9 and 9' are pressed together the knives 11 and 15' sever the stem, the knife 11 being carried by the handle 9 and the knife 15' by the jaw 15 and handle 9'. By the same operation the jaws 15 and 17 are brought together, and grasp the stem, the jaw 17 being operated by the pressure of the spring 19 which turns the disk 18 which carries the jaw 17. The spring yields to accommodate the stem. This action registers the notch 18' in the disk 18 with the pawl 25, which drops into said notch and interlocks the disks 16 and 18, thereby locking the jaws closed, since the disk 16 is rigid with the handle 9', and the fruit is held by its stem between said jaws. By the same operation the end of the slot 18'' is brought against the pin 22'' on the pivot 22, as shown in Fig. 14, thereby preventing the disk 21 from turning when the handles are released.

The next operation is to release the handles which are opened by the spring 27, and the disk 20, which is carried by the handle 9, is so turned that the pawl 28 carried by said disk engages in the notch z in the disk 21, as shown in Figs. 12 and 19, the jaws remaining closed.

In the next operation, the handles are pressed together again, and the pawl 28, turning with the disk 20, turns the disk 21 which carries the blade 21', and closes said blade against the blade 15'' and cuts off the stem held by the jaws, allowing the fruit to drop. In this action the lever spring y, the end of which is in the recess v as in Fig. 12, is engaged by the edge of the disk 18 at said recess, ready to lift the pawl 28 from the notch z, when the handles are released, as shown in Fig. 18, and also in this operation, the pin 22' swings under the pawl 25, and lifts the same out of the notch 18', as shown in Fig. 13, whereby the various disks are released from the pawls.

The last operation is to release the handles, which are opened by the spring 27 at which time the pin 20ª picks up the disk 21 by engaging the end of the slot 21ª, and returns the disk 21 to original position, all the parts resuming their original position for the next operation, the disk 18 being returned, and the jaw 17 opened, by the spring 19 as it follows the handle 9, the disks 12 and 20, and the knife 11, returning with the handle 9, and the disk 16, jaw 15 and knives 15' and 15'' returning with the handle 9'.

By the means described, the fruit is first cut from the tree or vine, and held by the stem still on the fruit, so that it may be carried to its proper receptacle, the stem is then cut off close to the fruit and the fruit dropped, and the knives and the jaws are then opened to original position.

What I claim as new is:

1. A fruit clipper comprising a pair of pivoted handles, a pair of blades and a pair of jaws, carried by said handles, and a second pair of blades, one blade of which is carried by one of said handles, and a releasable operating connection between the other blade and the other handle.

2. A fruit clipper comprising a pair of pivoted handles, two pairs of pivoted blades, a pair of jaws between said pairs of blades, means actuated by one operation of the handles to simultaneously close one pair of blades and the jaws, and means actuated by a succeeding operation of the handles to afterward close the other pair of blades.

3. A fruit clipper comprising a pair of handles one of which carries a pair of disks and a blade and the other of which carries a disk, two blades and a jaw between said blades, a pivot for said handles, extending through said disks, a disk mounted on said pivot and having a jaw and a spring connection to one of said handles, another disk mounted on said pivot and having a blade coöperating with one of said two blades, pawl connections between the disks carried by the handles and the two last mentioned disks, adapted to operate the latter.

4. A fruit clipper comprising a pair of handles, and a pivot connecting the same, disks 12 and 20 rigid with one of said handles, a blade 11 projecting from the disk 12, a disk 16, jaw 15 and blades 15' and 15'' rigid with the other handle, the blade 15' being arranged to coöperate with the blade 11, a disk 18 on the pivot, having a jaw 17 arranged to coöperate with the jaw 15, a spring connecting one of the handles and the disk 18, a disk 21 on the pivot, having a blade 21' adapted to coöperate with the blade 15'', said jaws being located between the two pairs of blades, a pawl 25 carried by the disk 16 and adapted to engage and operate the disk 18, and a pawl 28 carried by the disk 20 and adapted to engage and operate the disk 21.

5. A fruit picker comprising a pair of pivoted handles, a pair of blades and a pair of jaws, operatively connected to said handles and adapted to close by initial movewhich is carried by one of said handles, means including a pawl to operatively connect the other handle to the other of the last mentioned pair of blades on second movement of the handles, means actuated by the said initial movement to engage said pawl preparatory to the second movement, and means actuated by the second movement to release said pawl and restore the parts to original position.

In testimony whereof, I do affix my signature in presence of two witnesses.

LOUIS A. BOCKSTAHLER.

Witnesses:
  JOHN A. BOMMHARDT,
  F. M. TAGGETT.

Copies of this patent may be obtained for five cents each, by addressing the "Commissioner of Patents, Washington, D. C."